(12) United States Patent
Arashiro

(10) Patent No.: US 12,713,164 B2
(45) Date of Patent: Aug. 18, 2026

(54) SUBMARINE BRANCHING UNIT, AND CONTROL METHOD

(71) Applicant: NEC Corporation, Tokyo (JP)

(72) Inventor: Andre Arashiro, Tokyo (JP)

(73) Assignee: NEC CORPORATION, Tokyo (JP)

( * ) Notice: Subject to any disclaimer, the term of this patent is extended or adjusted under 35 U.S.C. 154(b) by 246 days.

(21) Appl. No.: 18/690,284

(22) PCT Filed: Sep. 24, 2021

(86) PCT No.: PCT/JP2021/035088
§ 371 (c)(1),
(2) Date: Mar. 8, 2024

(87) PCT Pub. No.: WO2023/047532
PCT Pub. Date: Mar. 30, 2023

(65) Prior Publication Data

US 2025/0133311 A1 Apr. 24, 2025

(51) Int. Cl.
*H04Q 11/00* (2006.01)
*H04B 10/27* (2013.01)
*H04J 14/02* (2006.01)

(52) U.S. Cl.
CPC ......... *H04Q 11/0005* (2013.01); *H04B 10/27* (2013.01); *H04J 14/0212* (2013.01); *H04Q 2011/0007* (2013.01)

(58) Field of Classification Search
CPC ........ H04Q 11/0005; H04Q 2011/0007; H04B 10/27; H04J 14/0212
See application file for complete search history.

(56) References Cited

U.S. PATENT DOCUMENTS

2020/0052788 A1 2/2020 Grubb et al.
2020/0169794 A1* 5/2020 Testa .................. G02B 6/29302

FOREIGN PATENT DOCUMENTS

JP H09-289488 A 11/1997
JP H10-150409 A 6/1998
JP 2021-164162 A 10/2021
WO 2014/106575 A1 7/2014

OTHER PUBLICATIONS

International Search Report for PCT Application No. PCT/JP2021/035088, mailed on Dec. 7, 2021.
Toshiyoshi, Hiroshi et al., Electrostatic micro torsion mirrors for an optical switch matrix, Journal of Microelectromechanical Systems, vol. 5, No. 4, Dec. 4, 1996, pp. 231-237.

* cited by examiner

*Primary Examiner* — Casey L Kretzer

(57) ABSTRACT

An object of present disclosure is to provide a submarine branching unit, a control method, and a non-transitory computer readable medium capable of implementing path switching of optical cables by using a smaller number of optical switches. A submarine branching unit according to the present disclosure includes: first to third optical switches each including first to fourth terminals; and a control unit configured to control a connection of each of the first to third optical switches to a vertical connection or a horizontal connection based on a specified connection state, in which: the first terminal of the first optical switch is connected to an input of a first line of a first path; the second terminal of the first optical switch is connected to the first terminal of the third optical switch.

12 Claims, 12 Drawing Sheets

SUBMARINE BRANCHING UNIT, AND CONTROL METHOD

This application is a National Stage Entry of PCT/JP2021/035088 filed on Sep. 24, 2021, the contents of all of which are incorporated herein by reference, in their entirety.

TECHNICAL FIELD

The present disclosure relates to a submarine branching unit, a control method, and a non-transitory computer readable medium. In particular, the present disclosure relates to a submarine branching unit, a control method, and a non-transitory computer readable medium capable of implementing path switching of optical cables by using a smaller number of optical switches than that previously used.

BACKGROUND ART

In recent years, there has been an increasing need for a more flexible system configuration for a submarine branching unit (BU: Branching Unit), and it has thus been becoming necessary to realize a configuration by which all feasible two-branch combination paths are established for three branches (between A and B/between A and C/between C and B) of a submarine branching unit. However, when 1×2 optical switches (SWs: Switches) are used, the number of fiber pairs (FPs: Fiber Pairs) is limited due to the upper limit of the number of optical switches that can be installed inside the housing of a submarine branching unit. Therefore, it is necessary to increase the upper limit of the number of optical switches that can be installed inside the housing by reducing the number of optical switches for the required number of fiber pairs by using 2×2 optical switches instead of using 1×2 optical switches. Note that branches are also referred to as paths.

In paragraph 0028 of Patent Literature 1, it is stated that "in the optical underwater branching unit shown in FIG. 5, the main transmission line connecting a station A with a station B is composed of two fiber pairs. Reversible 4-terminal optical circulators 1-1 to 1-4 are inserted and connected between the optical fibers 4-1 and 4-2 and the optical fibers 4-1' and 4-2' of the first fiber pairs, and between the optical fibers 4-3 and 4-4 and the optical fibers 4-3' and 4-4' of the second fiber pairs. Further, reversible 4-terminal optical circulators 1-5 and 1-6 are connected to two fiber pairs, i.e., the optical fibers 5-1 and 5-2 of the third fiber pair and the optical fiber pairs 5-3 and 5-4 of the fourth fiber pair, respectively, which constitute the branching paths. Note that the function of the reversible 4-terminal optical circulators 1-1 to 1-6 according to this example embodiment can also be implemented by 2×2 optical switches." Patent Literature 1 fails to disclose that the connection of each optical switch is controlled to a vertical connection or a horizontal connection based on the combination of branches to be connected.

Patent Literature 2 discloses, in paragraph 0018, a method for operating 2×2 optical switches. Patent Literature 2 fails to disclose that the connection of each optical switch is controlled to a vertical connection or a horizontal connection based on the combination of branches to be connected.

CITATION LIST

Patent Literature

Patent Literature 1: Japanese Unexamined Patent Application Publication No. H10-150409

Patent Literature 2: Japanese Unexamined Patent Application Publication No. H9-289488

SUMMARY OF INVENTION

Technical Problem

As described above, it has been desired to reduce the number of optical switches for the required number of fiber pairs, for example, by using 2×2 optical switches.

An object of the present disclosure is to provide a submarine branching unit, a control method, and a non-transient computer readable medium capable of solving the above-described problem.

Solution to Problem

A submarine branching unit according to the present disclosure includes:

first to third optical switches each including first to fourth terminals; and a control unit configured to control a connection of each of the first to third optical switches to a vertical connection or a horizontal connection based on a specified connection state, in which the first terminal of the first optical switch is connected to an input of a first line of a first path, the second terminal of the first optical switch is connected to the first terminal of the third optical switch, the third terminal of the first optical switch is connected to an output of the first line of a second path, the fourth terminal of the first optical switch is connected to the third terminal of the second optical switch, the first terminal of the second optical switch is connected to the third terminal of the third optical switch, the second terminal of the second optical switch is connected to an output of a second line of the first path, the fourth terminal of the second optical switch is connected to an input of a first line of a third path, the second terminal of the third optical switch is connected to an output of a second line of the third path, and the fourth terminal of the third optical switch is connected to an input of a second line of the second path.

A submarine branching unit according to the present disclosure includes:

first to sixth optical switches each including first to fourth terminals; and a control unit configured to control a connection of each of the first to sixth optical switches to a vertical connection or a horizontal connection based on a specified connection state, in which the first terminal of the first optical switch is connected to an input of a first line of a first path, the second terminal of the first optical switch is connected to the first terminal of the third optical switch, the third terminal of the first optical switch is connected to an output of the first line of a second path, the fourth terminal of the first optical switch is connected to the third terminal of the second optical switch, the first terminal of the second optical switch is connected to the third terminal of the third optical switch, the second terminal of the second optical switch is connected to an output of a second line of the first path, the fourth terminal of the second optical switch is connected to an input of a first line of a third path, the second terminal of the third optical switch is connected to an output of a second line of the third path, the fourth terminal of the third optical switch is connected to an input of a second line of the second path, the first terminal of the fourth optical switch is connected to an output of the first line of the first path, the second terminal of the fourth optical switch is connected to the first terminal of the sixth optical switch, the third terminal of the fourth optical switch is connected to an input of the first line of the second path, the fourth terminal of the fourth optical switch is connected to the third terminal of the fifth optical switch, the first terminal of the fifth optical switch is connected to the third terminal of the sixth optical switch, the second terminal of the fifth optical switch is connected to an input of the second line of the first path, the fourth terminal of the fifth optical switch is connected to an output of the first line of the third path, the second terminal of the sixth optical switch is connected to an input of the second line of the third path, and the fourth terminal of the sixth optical switch is connected to an output of the second line of the second path.

A control method according to the present disclosure is a method for controlling a submarine branching unit, the submarine branching unit including first to third optical switches each including first to fourth terminals, in which the first terminal of the first optical switch is connected to an input of a first line of a first path, the second terminal of the first optical switch is connected to the first terminal of the third optical switch, the third terminal of the first optical switch is connected to an output of the first line of a second path, the fourth terminal of the first optical switch is connected to the third terminal of the second optical switch, the first terminal of the second optical switch is connected to the third terminal of the third optical switch, the second terminal of the second optical switch is connected to an output of a second line of the first path, the fourth terminal of the second optical switch is connected to an input of a first line of a third path, the second terminal of the third optical switch is connected to an output of a second line of the third path, and the fourth terminal of the third optical switch is connected to an input of a second line of the second path, in which the method includes controlling a connection of each of the first to third optical switches to a vertical connection or a horizontal connection based on a specified connection state.

A non-transitory computer readable medium according to the present disclosure stores a program for causing a computer to perform a method for controlling a submarine branching unit, the submarine branching unit including first to third optical switches each including first to fourth terminals, in which the first terminal of the first optical switch is connected to an input of a first line of a first path, the second terminal of the first optical switch is connected to the first terminal of the third optical switch, the third terminal of the first optical switch is connected to an output of the first line of a second path, the fourth terminal of the first optical switch is connected to the third terminal of the second optical switch, the first terminal of the second optical switch is connected to the third terminal of the third optical switch, the second terminal of the second optical switch is connected to an output of a second line of the first path, the fourth terminal of the second optical switch is connected to an input of a first line of a third path, the second terminal of the third optical switch is connected to an output of a second line of the third path, and the fourth terminal of the third optical switch is connected to an input of a second line of the second path, in which the method includes controlling a connection of each of the first to third optical switches to a vertical connection or a horizontal connection based on a specified connection state.

Advantageous Effects of Invention

According to the present disclosure, it is possible to provide a submarine branching unit, a control method, and a non-transitory computer readable medium capable of implementing path switching of optical cables by using a smaller number of optical switches.

EXAMPLE EMBODIMENT

Figure 1:
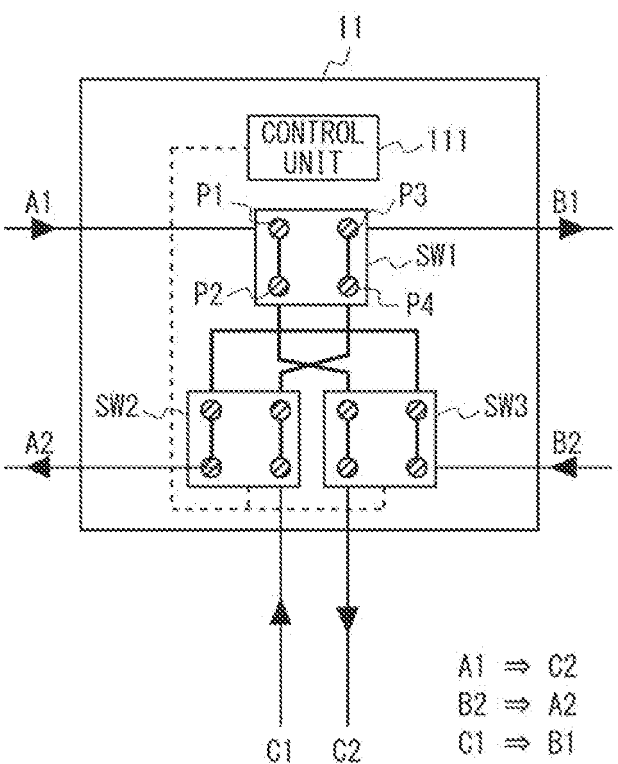
FIG. 1 is a block diagram showing an example of a submarine branching unit according to an example embodiment.

An example embodiment according to the present invention will be described hereinafter with reference to the drawings. The same or corresponding elements are assigned the same reference numerals (or symbols), and redundant descriptions thereof are omitted as appropriate for clarity of description.

EXAMPLE EMBODIMENT

<Minimum Configuration>

FIG. 1 is a block diagram showing an example of a submarine branching unit according to an example embodiment.

FIG. 1 shows a submarine branching unit having a minimum configuration according to an example embodiment.

As shown in FIG. 1, a submarine branching unit 11 according to an example embodiment includes a first optical switch SW1, a second optical switch SW2, a third optical switch SW3, and a control unit 111.

Each of the first, second and third optical switches SW1, SW2 and SW3 includes a first terminal P1, a second terminal P2, a third terminal P3, and a fourth terminal P4.

The control unit 111 controls the connection of each of the first, second and third optical switches SW1, SW2 and SW3 to a vertical connection or a horizontal connection based on a specified connection state (State).

The first terminal P1 of the first optical switch SW1 is connected to the input of a first line A1 of a first path. The second terminal P2 of the first optical switch SW1 is connected to the first terminal P1 of the third optical switch SW3. The third terminal P3 of the first optical switch SW1 is connected to the output of a first line B1 of a second path. The fourth terminal P4 of the first optical switch SW1 is connected to the third terminal P3 of the second optical switch SW2.

The first terminal P1 of the second optical switch SW2 is connected to the third terminal P3 of the third optical switch SW3. The second terminal P2 of the second optical switch SW2 is connected to the output of a second line A2 of the first path. The fourth terminal P4 of the second optical switch SW2 is connected to the input of a first line C1 of a third path.

The second terminal P2 of the third optical switch SW3 is connected to the output of a second line C2 of the third path. The fourth terminal P4 of the third optical switch SW3 is connected to the input of a second line B2 of the second path.

The submarine branching unit 11 according to the example embodiment is a branching unit that can freely changing combinations of fiber pairs (FPs: Fiber Pairs) on a trunk side, which is connected to a blank side of the optical submarine cable connecting terminal station apparatuses by switching optical switches SWs provided inside the branching unit 11.

In this example, one transmission/reception is constituted by the first and second lines A1 and A2 of the first path, and another transmission/reception is constituted by the first and second lines B1 and B2 of the second path. Further, another transmission/reception is constituted by the first and second lines C1 and C2 of the third path.

Note that each of the first, second and third optical switches SW1, SW2 and SW3 is, for example, a 2×2 optical switch. Optical switches are also referred to as optical path switches or switches.

Note that the vertical connection means connections in which in each of the first to third optical switches SW1 to SW3, the first terminal P1 is connected to the second terminal P2; the third terminal P3 is connected to the fourth terminal P4; the first terminal P1 is not connected to the third terminal P3; and the second terminal P2 is not connected to the fourth terminal P4. The horizontal connection means connections in which in each of the first to third optical switches SW1 to SW3, the first terminal P1 is connected to the third terminal P3; the second terminal P2 is connected to the fourth terminal P4; the first terminal P1 is not connected to the second terminal P2; and the third terminal P3 is not connected to the fourth terminal P4.

First to fifth states and a method for controlling the control unit 111 for implementing these states will be described hereinafter. An N-th state is also expressed to as State N (where N is an integer from 1 to 5).

In the first state (see SW1 to SW3 in FIG. 1 or FIG. 3A), the input of the first line A1 of the first path is connected to the output of the second line C2 of the third path; the input of the second line B2 of the second path is connected to the output of the second line A2 of the first path; and the input of the first line C1 of the third path is connected to the output of the first line B1 of the second path. When the control unit 111 implements the first state, it controls the connection of each of the first to third optical switches SW1 to SW3 to the vertical connection.

In the second state (see SW1 to SW3 in FIG. 3B), the input of the first line A1 of the first path is connected to the output of the first line B1 of the second path; the input of the second line B2 of the second path is connected to the output of the second line C2 of the third path; and the input of the first line C1 of the third path is connected to the output of the second line A2 of the first path. When the control unit 111 implements the second state, it controls the connection of each of the first to third optical switches SW1 to SW3 to the horizontal connection.

In the third state (see SW1 to SW3 in FIG. 3C), the input of the first line A1 of the first path is connected to the output of the first line B1 of the second path; the input of the second line B2 of the second path is connected to the output of the second line A2 of the first path; and the input of the first line C1 of the third path is connected to the output of the second line C2 of the third path. When the control unit 111 implements the third state, it controls the connection of the first optical switch SW1 to the horizontal connection and controls the connection of each of the second and third optical switches SW2 and SW3 to the vertical connection.

In the fourth state (see SW1 to SW3 in FIG. 3D), the input of the first line A1 of the first path is connected to the output of the second line C2 of the third path; the input of the second line B2 of the second path is connected to the output of the first line B1 of the second path; and the input of the first line C1 of the third path is connected to the output of the second line A2 of the first path. When the control unit 111 implements the fourth state, it controls the connection of each of the first and third optical switches SW1 and SW3 to the vertical connection and controls the connection of the second optical switch SW2 to the horizontal connection.

In the fifth state (see SW1 to SW3 in FIG. 3E), the input of the first line A1 of the first path is connected to the output of the second line A2 of the first path; the input of the second line B2 of the second path is connected to the output of the second line C2 of the third path; and the input of the first line C1 of the third path is connected to the output of the first line B1 of the second path. When the control unit 111 implements the fifth state, it controls the connection of each of the first and second optical switches SW1 and SW2 to the vertical connection and controls the connection of the third optical switch SW3 to the horizontal connection.

<Configuration>

In the minimum configuration of the submarine branching unit shown in FIG. 1, regarding the first line A1 of the first path, for example, only the input is handled and the output is not handled. Therefore, regarding the first line A1 of the first path, configurations in which the output is also handled are shown in FIGS. 3A to 3E. In the examples shown in FIGS. 3A to 3E, one FP (Fiber Pair) is formed by the first and second lines A1 and A2 of the first path, and another FP is formed by the first and second lines B1 and B2 of the second path. Further, another FP is formed by the first and second lines C1 and C2 and the third path.

Figure 2:
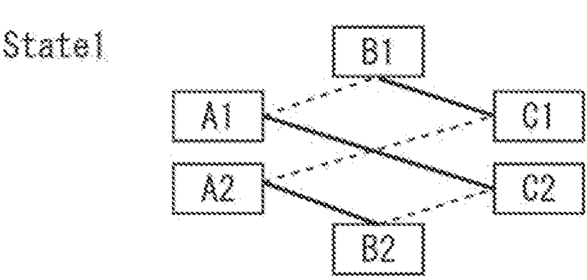
FIG. 2 is a block diagram showing an example of connection states (States) of a submarine branching unit according to an example embodiment.
Figure 2:
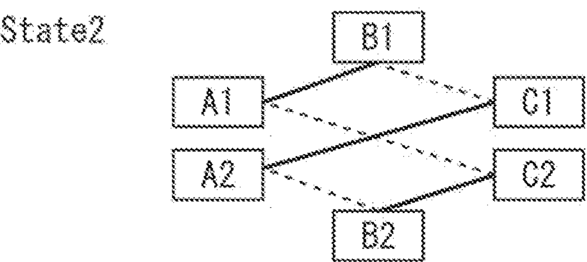
Figure 2:
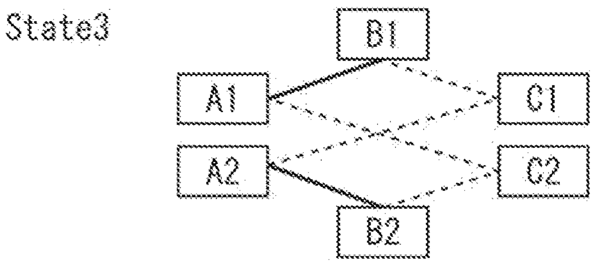
Figure 2:
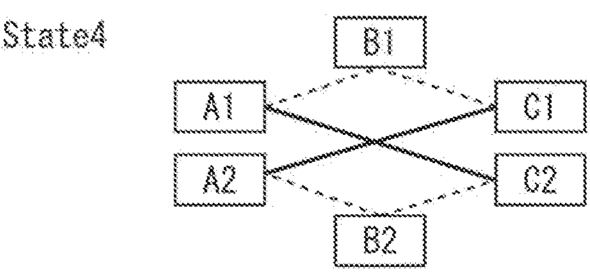
Figure 2:
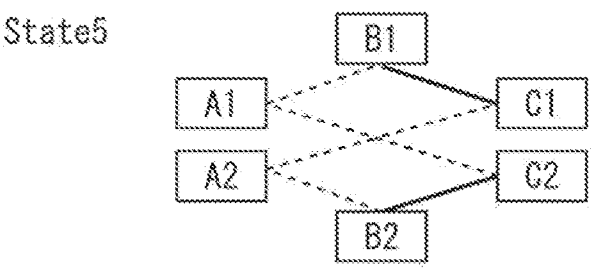

FIG. 2 is a block diagram showing an example of connection states (States) of the submarine branching unit according to the example embodiment.

Connection states are also referred to as path configuration states.

Note that the first line A1 of the first path is also referred to as A1; the second line A2 of the first path is also referred to as A2; the first line B1 of the second path is also referred to as B1; the second line B2 of the second path is also referred to as B2; the first line C1 of the third path is also referred to as C1; and the second line C2 of the third path is also referred to as C2.

As shown in FIG. 2, the state of the submarine branching unit 11 can be changed to any of the first state (State 1) to the fifth state (State 5) by using (driving) the optical switches SWs. The first state is a state in which: A1 is connected to C2; A2 is connected to B2; and B1 is connected to C1. The second state is a state in which: A1 is connected to B1; A2 is connected to C1; and B2 is connected to C2. The third state is a state in which A1 is connected to B1 and A2 is connected to B2. The fourth state is a state in which A1 is connected to C2 and A2 is connected to C1. The fifth state is a state in which B1 is connected to C1 and B2 is connected to C2.

The first to fifth states will be described in a more detailed manner.

FIGS. 3A to 3E are block diagrams showing an example of the submarine branching unit according to the example embodiment.

Figure 3A:
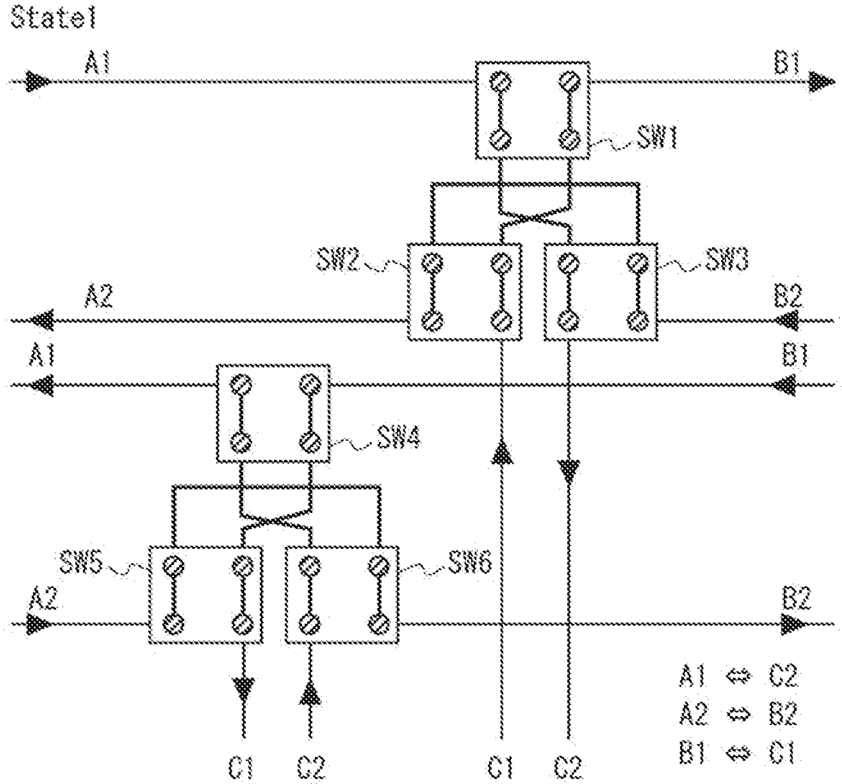
FIG. 3A is a block diagram showing an example of a submarine branching unit according to an example embodiment.

FIG. 3A shows the first state (State 1).

Figure 3B:
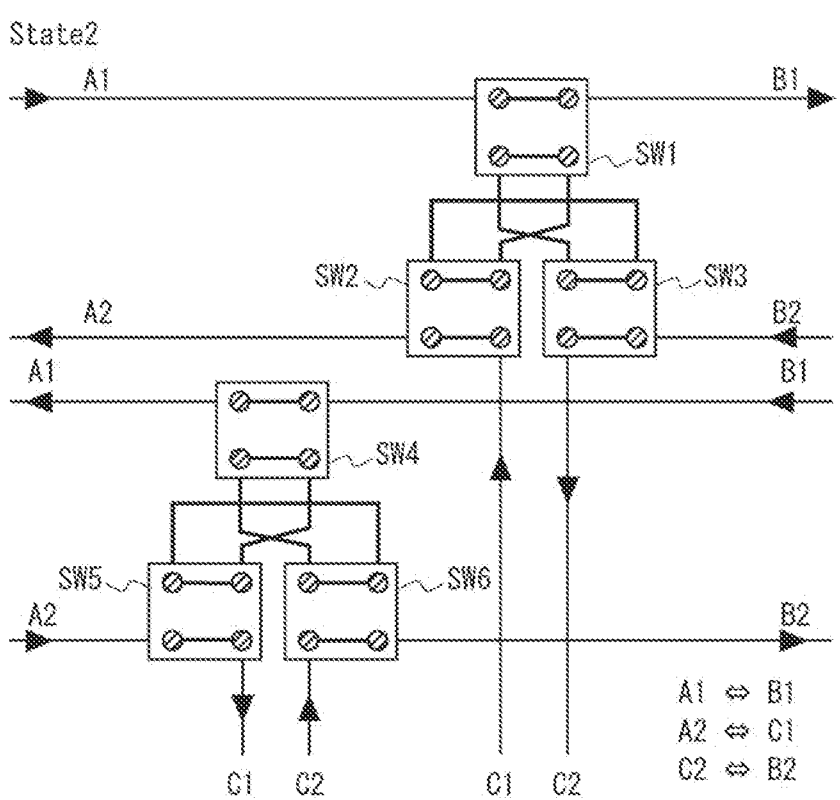
FIG. 3B is a block diagram showing an example of a submarine branching unit according to an example embodiment.

FIG. 3B shows the second state (State 2).

Figure 3C:
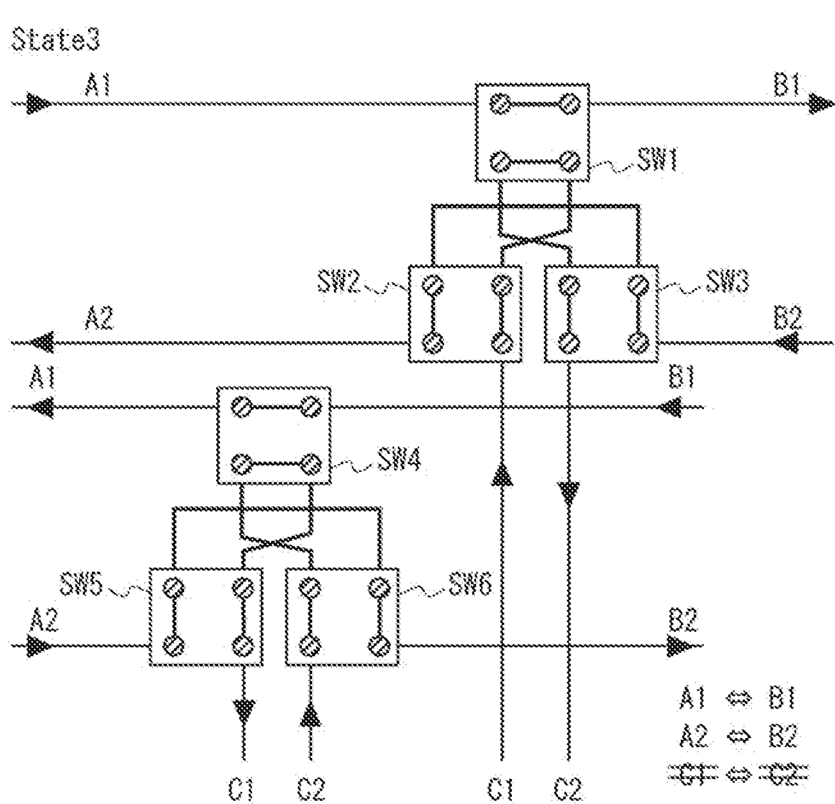
FIG. 3C is a block diagram showing an example of a submarine branching unit according to an example embodiment.

FIG. 3C shows the third state (State 3).

Figure 3D:
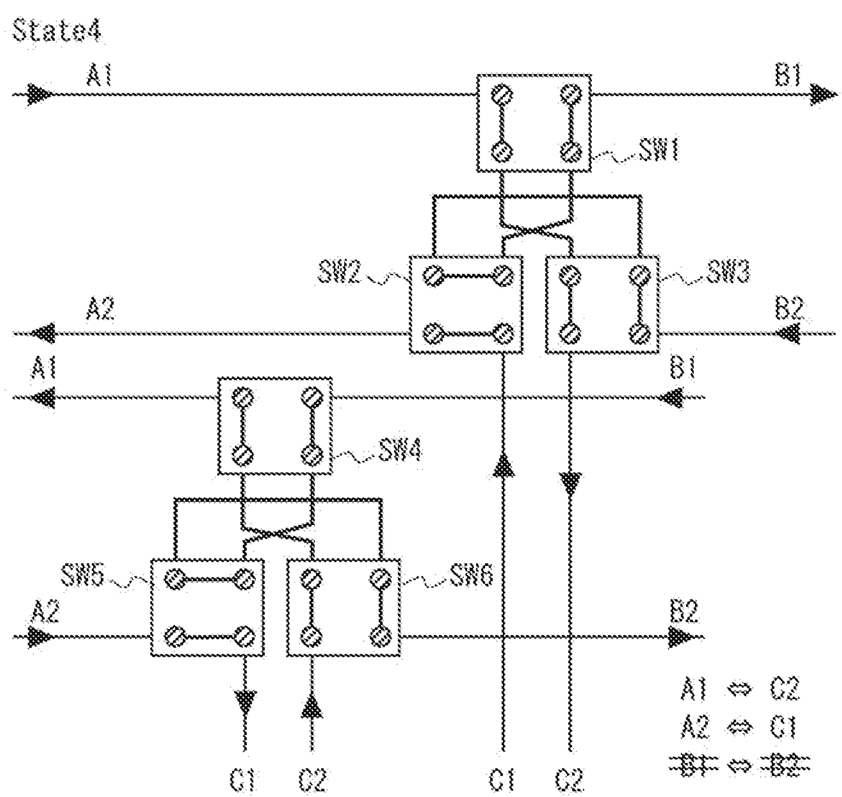
FIG. 3D is a block diagram showing an example of a submarine branching unit according to an example embodiment.

FIG. 3D shows the fourth state (State 4).

Figure 3E:
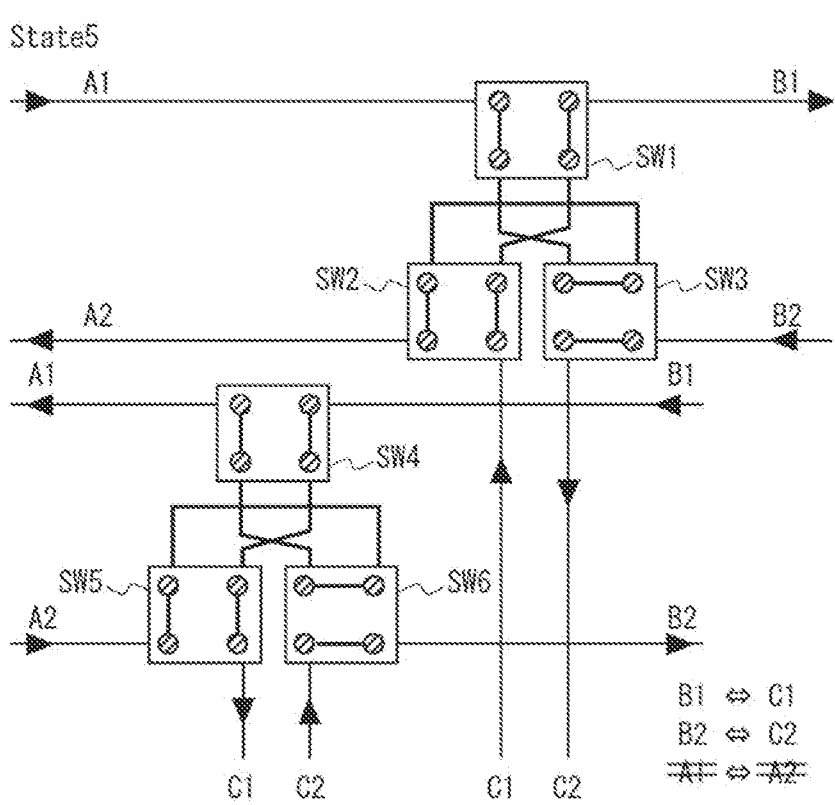
FIG. 3E is a block diagram showing an example of a submarine branching unit according to an example embodiment.

FIG. 3E shows the fifth state (State 5).

FIGS. 3A to 3E show settings of drive circuits of optical switches SWs according to the example embodiment.

In FIGS. 3A to 3E, the control unit 111 is omitted for simplicity.

As shown in FIGS. 3A to 3E, the submarine branching unit according to the example embodiment includes two minimum configurations each of which is equivalent to one shown in FIG. 1. In this way, optical fibers of two FPs (a pair of A1 and A2, a pair of B1 and B2, and a pair of C1 and C2) are input and output from each of branches A to C of the submarine branching unit 11. The submarine branching unit 11 has a configuration in which optical fibers of two FPs are input and output, and in which six optical switches SWs are arranged. The optical switches SWs are, for example, 2×2 optical switches SWs. The submarine branching unit 11 establishes any of all the paths by controlling each of these six optical switches SWs to the vertical connection and/or the horizontal connection. Note that branches are also referred to as paths.

As shown in the upper part of FIG. 3B, the submarine branching unit 11 includes a first optical switch SW1 that can directly connect A1 with B1 by the switching of the optical switch SW, a second optical switch SW2 that can directly connect A2 with C1 by the switching of the optical switch SW, and a third optical switch SW3 that can directly connect B2 with C2 by the switching of the optical switch SW.

As shown in the lower part of FIG. 3B, the submarine branching unit 11 also includes a fourth optical switch SW4 that can directly connect A1 with B1 by the switching of the optical switch SW, a fifth optical switch SW5 that can directly connect A2 with C1 by the switching of the optical switch SW, and a sixth optical switch SW6 that can directly connect B2 with C2 by the switching of the optical switch SW.

The configuration of the submarine branching unit 11 will be described hereinafter in a more detailed manner.

As shown in FIGS. 3A to 3E, the submarine branching unit 11 according to the example embodiment includes the first to sixth optical switches SW1 to SW6 and the control unit 111.

Each of the first to sixth optical switches SW1 to SW6 includes first to fourth terminals P1 to P4.

The control unit 111 controls the connection of each of the first to sixth optical switches SW1 to SW6 to the vertical connection or the horizontal connection based on a specified connection state (State).

The connections of the first to third optical switches SW1 to SW3 are similar to those of the minimum configuration (see FIG. 1), so that descriptions of them will be omitted because they have already been described.

The first terminal P1 of the fourth optical switch SW4 is connected to the output of the first line A1 of the first path. The second terminal P2 of the fourth optical switch SW4 is connected to the first terminal P1 of the sixth optical switch SW6. The third terminal P3 of the fourth optical switch SW4 is connected to the input of the first line B1 of the second path. The fourth terminal P4 of the fourth optical switch SW4 is connected to the third terminal P3 of the fifth optical switch SW5.

The first terminal P1 of the fifth optical switch SW5 is connected to the third terminal P3 of the sixth optical switch SW6. The second terminal P2 of the fifth optical switch SW5 is connected to the input of the second line A2 of the first path. The fourth terminal P4 of the fifth optical switch SW5 is connected to the output of the first line C1 of the third path.

The second terminal P2 of the sixth optical switch SW6 is connected to the input of the second line C2 of the third path. The fourth terminal P4 of the sixth optical switch SW6 is connected to the output of the second line B2 of the second path.

Each of the first to sixth optical switches SW1 to SW6 is, for example, a 2×2 optical switch.

Note that the vertical connection means connections in which in each of the first to sixth optical switches SW1 to SW6, the first terminal P1 is connected to the second terminal P2; the third terminal P3 is connected to the fourth terminal P4; the first terminal P1 is not connected to the third terminal P3; and the second terminal P2 is not connected to the fourth terminal P4. The horizontal connection means connections in which in each of the first to sixth optical switches SW1 to SW6, the first terminal P1 is connected to the third terminal P3; the second terminal P2 is connected to the fourth terminal P4; the first terminal P1 is not connected to the second terminal P2; and the third terminal P3 is not connected to the fourth terminal P4.

First to fifth states and a method for controlling the control unit 111 for implementing these states will be described hereinafter. The first and second lines A1 and A2 of the first path are collectively referred to as a first path A; the first and second lines B1 and B2 of the second path are collectively referred to as a second path B; and the first and second lines C1 and C2 of the third path are collectively referred to as a third path A.

The submarine branching unit 11 can establish any of all the paths between two branches, which can be configured by the first, second and third paths A, B and C, by controlling the configurations of the optical switches SWs and combining them according to the first to fifth states.

In the first state (see FIG. 3A), the input of the first line A1 of the first path is connected to the output of the second line C2 of the third path; the input of the second line B2 of the second path is connected to the output of the second line A2 of the first path; the input of the first line C1 of the third path is connected to the output of the first line B1 of the second path; the input of the second line A2 of the first path is connected to the output of the second line B2 of the second path; the input of the first line B1 of the second path is connected to the output of the first line C1 of the third path; and the input of the second line C2 of the third path is connected to the output of the first line A1 of the first path. That is, in the first state, the first line A1 of the first path and the second line C2 of the third path are connected to each other; the second line A2 of the first path and the second line B2 of the second path are connected to each other; and the first line B1 of the second path and the first line C1 of the third path are connected to each other. In this way, all feasible two-branch combination paths are established for the three paths (between A and B/between A and C/between C and B) by connecting the first, second and third paths A, B and C to each other. Therefore, the first state is a state in which all the paths are connected to each other.

When the control unit 111 implements the first state, it controls the connection of each of the first to sixth optical switches SW1 to SW6 to the vertical connection. In this way, a configuration including paths A1-C2, A2-B2, and B1-C1 is established in the first state.

In the second state (see FIG. 3B), the input of the first line A1 of the first path is connected to the output of the first line B1 of the second path; the input of the second line B2 of the second path is connected to the output of the second line C2 of the third path; the input of the first line C1 of the third path is connected to the output of the second line A2 of the first path; the input of the second line A2 of the first path is connected to the output of the first line C1 of the third path; the input of the first line B1 of the second path is connected to the output of the first line A1 of the first path; and the input of the second line C2 of the third path is connected to the output of the second line B2 of the second path. That is, in the second state, the first line A1 of the first path and the first line B1 of the second path are connected to each other; the second line A2 of the first path and the first line C1 of the third path are connected to each other; and the second line C2 of the third path and the second line B2 of the second path are connected to each other. In this way, the first, second and third paths A, B and C are connected to each other. Therefore, the second state is a state in which all the paths are connected to each other.

When the control unit 111 implements the second state, it controls the connection of each of the first to sixth optical switches SW1 to SW6 to the horizontal connection. In this way, a configuration including paths A1-B1, A2-C1, and B2-C2 is established in the second state.

In the third state (see FIG. 3C), the input of the first line A1 of the first path is connected to the output of the first line B1 of the second path; the input of the second line B2 of the second path is connected to the output of the second line A2 of the first path; the input of the first line C1 of the third path is connected to the output of the second line C2 of the third path; the input of the second line A2 of the first path is connected to the output of the second line B2 of the second path; the input of the first line B1 of the second path is connected to the output of the first line A1 of the first path; and the input of the second line C2 of the third path is connected to the output of the first line C1 of the third path. That is, in the third state, the first line A1 of the first path and the first line B1 of the second path are connected to each other, and the second line A2 of the first path and the second line B2 of the second path are connected to each other. Further, in the third state, the first line C1 of the third path is connected to the second line C2 of the third path, so that it does not function as path switching. The third state is not a state in which all the paths are connected to each other.

When the control unit 111 implements the third state, it controls the connection of each of the first and fourth optical switches SW1 and SW4 to the horizontal connection, and controls the connection of each of the second, third, fifth and sixth optical switches SW2, SW3, SW5 and SW6 to the vertical connection. In this way, a configuration including paths A1-B1 and A2-B2 is established in the third state.

In the fourth state (see FIG. 3D), the input of the first line A1 of the first path is connected to the output of the second line C2 of the third path; the input of the second line B2 of the second path is connected to the output of the first line B1 of the second path; the input of the first line C1 of the third path is connected to the output of the second line A2 of the first path; the input of the second line A2 of the first path is connected to the output of the first line C1 of the third path; the input of the first line B1 of the second path is connected to the output of the second line B2 of the second path; and the input of the second line C2 of the third path is connected to the output of the first line A1 of the first path. Similarly to the third state, the fourth state is not a state in which all the paths are connected to each other.

When the control unit 111 implements the fourth state, it controls the connection of each of the first, third, fourth and sixth optical switches SW1, SW3, SW4 and SW6 to the vertical connection, and controls the connection of each of the second and fifth optical switches SW2 and SW5 to the horizontal connection. In this way, a configuration including paths A1-C2 and A2-C1 is established in the fourth state.

In the fifth state (see FIG. 3E), the input of the first line A1 of the first path is connected to the output of the second line A2 of the first path; the input of the second line B2 of the second path is connected to the output of the second line C2 of the third path; the input of the first line C1 of the third path is connected to the output of the first line B1 of the second path; the input of the second line A2 of the first path is connected to the output of the first line A1 of the first path; the input of the first line B1 of the second path is connected to the output of the first line C1 of the third path; and the input of the second line C2 of the third path is connected to the output of the second line B2 of the second path. Similarly to the third state, the fifth state is not a state in which all the paths are connected to each other.

When the control unit 111 implements the fifth state, it controls the connection of each of the first, second, fourth and fifth optical switches SW1, SW2, SW4 and SW5 to the vertical connection, and controls the connection of each of the third and sixth optical switches SW3 and SW6 to the horizontal connection. In this way, a configuration including paths B1-C1 and B2-C2 is established in the fifth state.

The submarine branching unit 11 according to the example embodiment can implement the first to fifth states by controlling the connection of each of the optical switches SWs to the vertical connection or the horizontal connection, and thereby can set various paths. In particular, in each of the first and second states, all feasible two-branch combination paths are established for the three paths (between A and B/between A and C/between C and B). Further, 2×2 optical switches are used in the example embodiment, so that the number of optical switches SWs can be reduced compared to the number of optical switches used in a comparison example (which will be described later). In the above-described example, the number of required optical switches SWs is six (see FIGS. 3A to 3E).

As a result, according to the example embodiment, it is possible to provide a submarine branching unit, a control method, and a non-transitory computer readable medium capable of implementing path switching of optical cables by using a smaller number of optical switches.

Further, the submarine branching unit 11 according to the example embodiment can reduce the number of required optical switches SWs, and thereby can increase the number of optical switches SWs that can be installed in one apparatus by a number equivalent to the decrement. As a result, it is possible to increase the number of FPs to which one apparatus can adapt, and thereby to increase the density of adaptable FPs.

Further, the submarine branching unit 11 according to the example embodiment can implement a state in which all the paths are connected to each other in either of two different states, i.e., in either of the first and second states. Further, since the state in which all the paths are connected to each other is implemented in two different states (the first and second states), the state can be switched more flexibly. When the current state needs to be changed to a state in which all the paths are connected to each other, the current state may be changed to the first or second state by switching optical switches SWs. In this process, unlike the case where the state in which all the paths are connected to each other can be implemented only in one state (e.g., only in the second state), the current state may be changed to either one of the first and second states to which the current state can be changed by a smaller number of times of switching of optical switches SWs. In this way, the example embodiment can reduce the number of times of switching of optical switches SWs and its switching time.

The number of times of switching of optical switches SWs that need to be performed in order to change the state of the submarine branching unit from the fourth state (see FIG. 3D) to a state in which all the paths are connected to each other will be examined hereinafter.

For example, in the case where only the second state (see FIG. 3B) is a state in which all the paths are connected to each other, in order to change the state from the fourth state to the second state, it is necessary to switch (control) each of four optical switches SWs, i.e., the first, third, fourth and sixth optical switches SW1, SW3, SW4 and SW6, to the horizontal connection.

In contrast, in the example embodiment, since the first and second states are both states where all the paths are connected to each other, it is sufficient if the state is changed from the fourth state to either one of the first and second states to which the state can be changed from the fourth state by a smaller number of times of switching of optical switches SWs. In this case, the number of times of switching of optical switches SWs is smaller when the state is changed from the fourth state to the first state. In order to change the state from the fourth state to the first state, it is sufficient if each of two optical switches SWs, i.e., each of the second and fifth optical switches SW2 and SW5, is switched (controlled) to the vertical connection.

As described above, in the example embodiment, it is possible to reduce the number of times of switching of optical switches SWs and its switching time when a state in which all the paths are connected to each other is to be implemented.

In general, switching of an optical switch of a submarine branching unit is performed by transmitting a switching signal from a land apparatus to the submarine branching unit. However, because the distance from the land apparatus to the submarine branching unit is long, the switching signal transmitted from the land apparatus may not reach the submarine branching unit when the switching signal is transmitted only once. Therefore, the switching signal for switching one optical switch is transmitted several times or several tens of times. Accordingly, the number of times of actual transmission of the switching signal can be greatly reduced by reducing the number of times of switching by only once, so that its effect is larger. Further its switching time is also reduced.

Further, in the case where one of the optical switches SWs has failed, the first or second state may be implemented by controlling the other optical switches SWs that have not failed based on the failure state of the failed optical switch SW, and by doing so, a state in which all the paths are connected to each other may be implemented.

Specifically, when one of the optical switches SWs has failed in a state in which that optical switch remains in the vertical connection, the other optical switches SWs, which have not failed, may be controlled so that the state is changed to the first state, and by doing so, a state in which all the paths are connected to each other may be implemented. Further, when one of the optical switches SWs has failed in a state in which that optical switch remains in the horizontal connection, the other optical switches SWs, which have not failed, may be controlled so that the state is changed to the second state, and by doing so, a state in which all the paths are connected to each other may be implemented.

COMPARATIVE EXAMPLE

FIGS. 4A to 4E are block diagrams showing an example of a submarine branching unit according to a comparative example of an example embodiment.

Figure 4A:
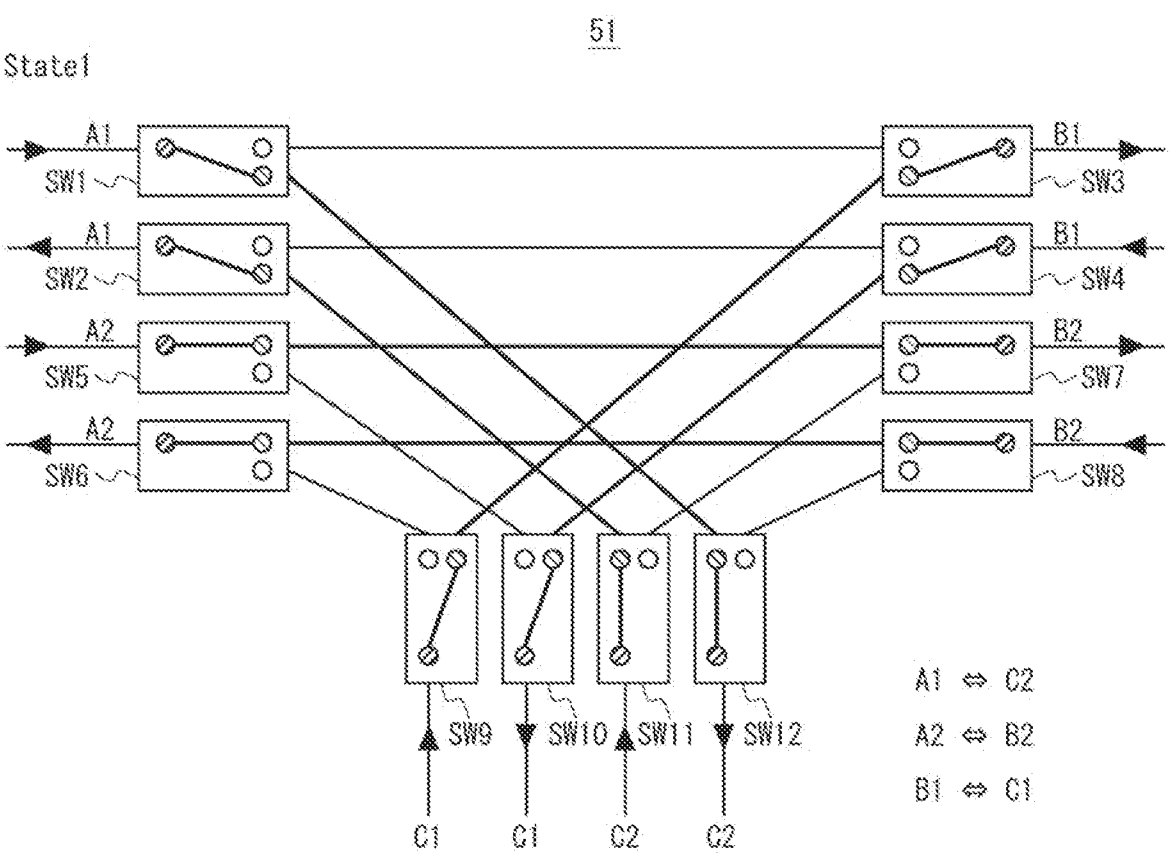
FIG. 4A is a block diagram showing an example of a submarine branching unit according to a comparative example of an example embodiment.

FIG. 4A shows a first state (State 1).

Figure 4B:
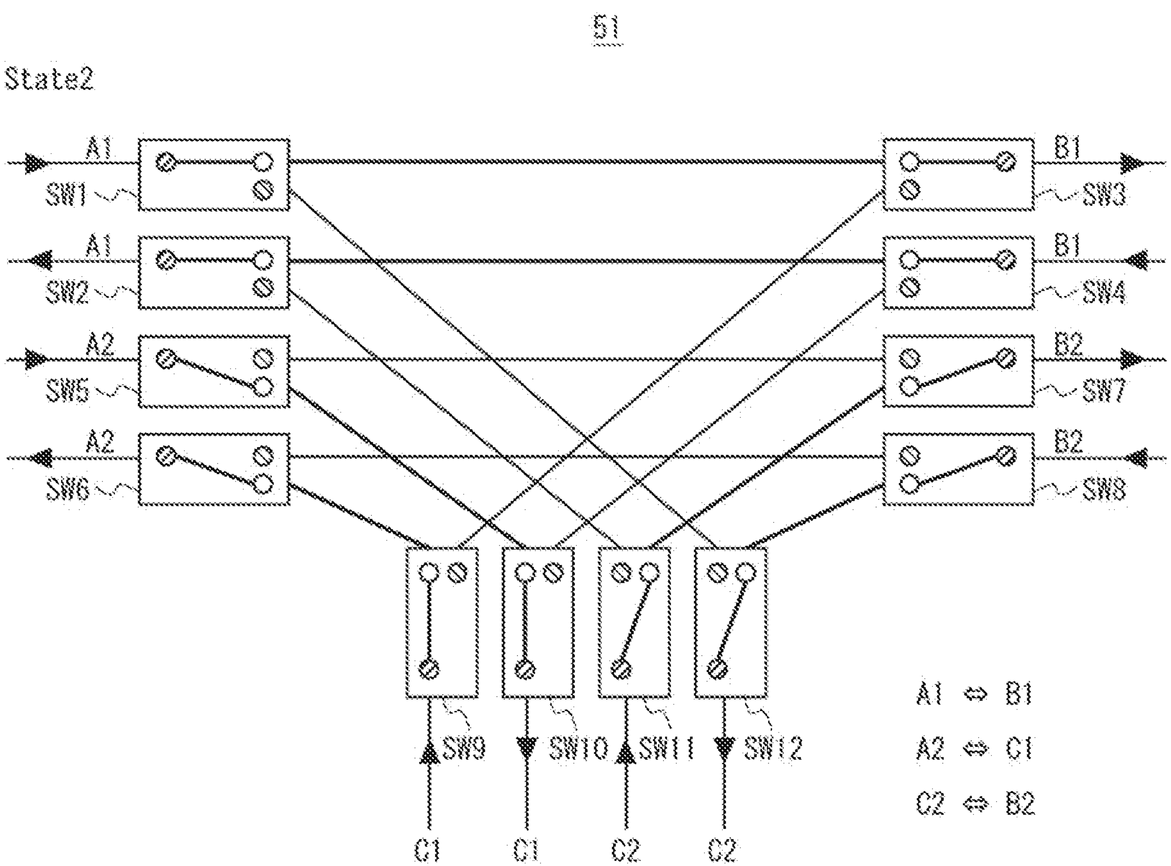
FIG. 4B is a block diagram showing an example of a submarine branching unit according to a comparative example of an example embodiment.

FIG. 4B shows a second state (State 2).

Figure 4C:
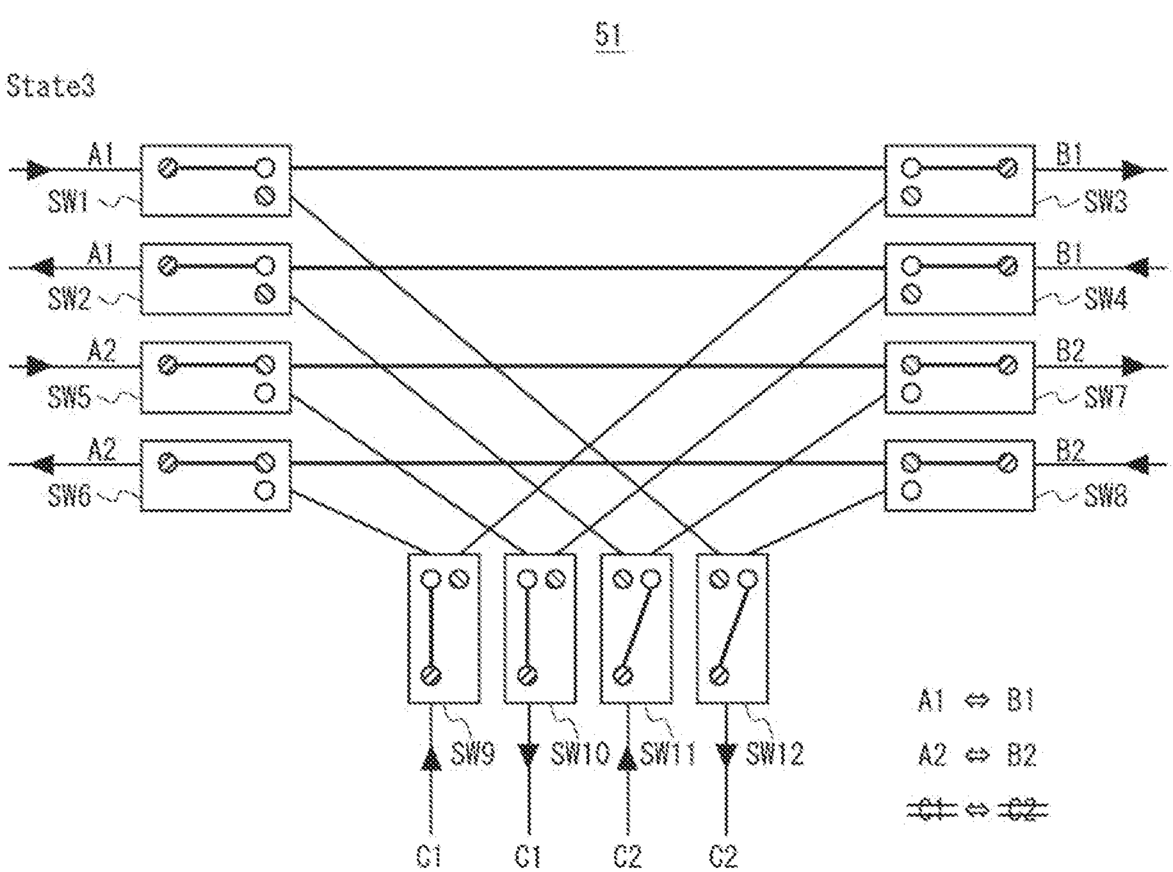
FIG. 4C is a block diagram showing an example of a submarine branching unit according to a comparative example of an example embodiment.

FIG. 4C shows a third state (State 3).

Figure 4D:
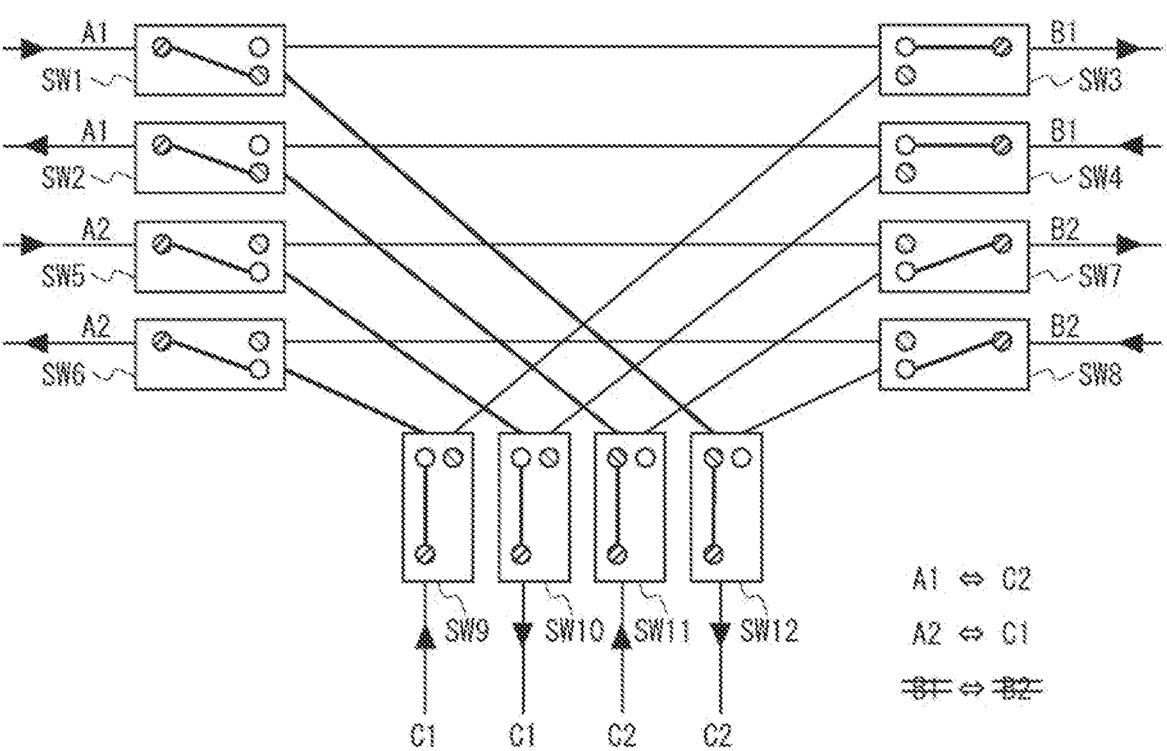
FIG. 4D is a block diagram showing an example of a submarine branching unit according to a comparative example of an example embodiment.

FIG. 4D shows a fourth state (State 4).

Figure 4E:
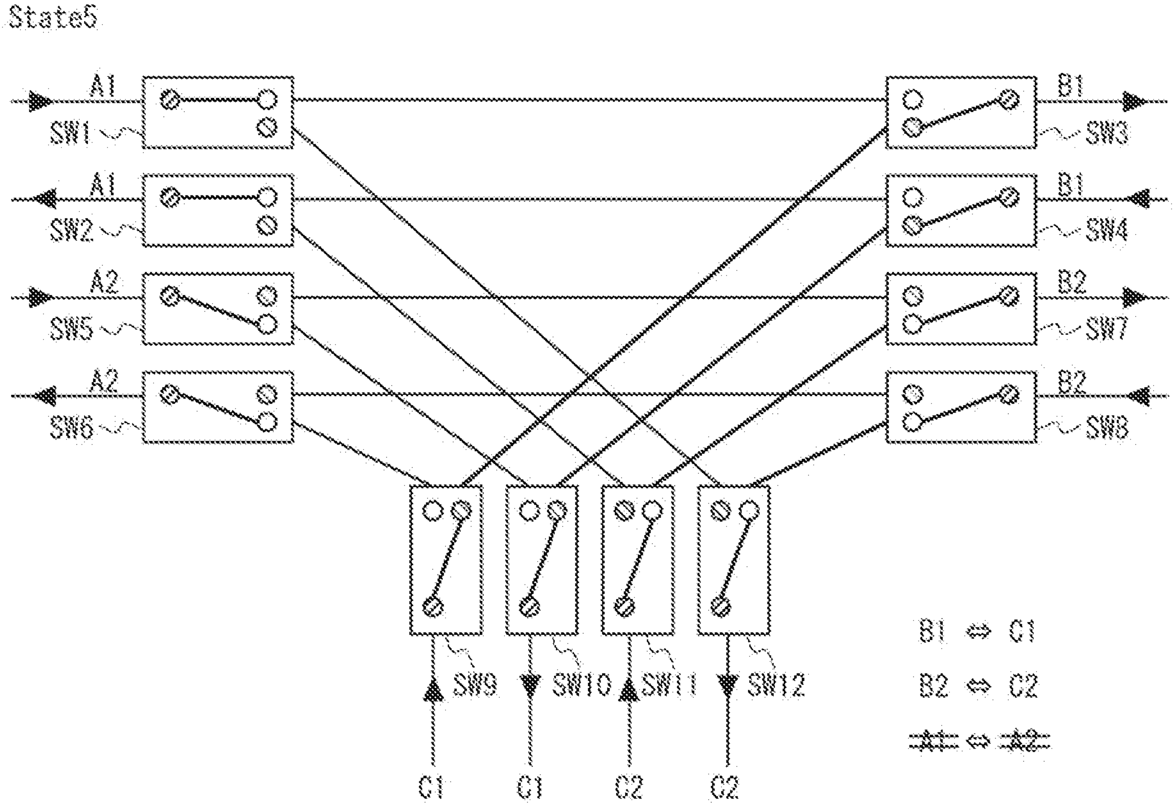
FIG. 4E is a block diagram showing an example of a submarine branching unit according to a comparative example of an example embodiment.

FIG. 4E shows a fifth state (State 5).

As shown in FIG. 4 A, in the case of implementing the first state, the submarine branching unit 51 according to the comparative example connects the input of the first line A1 of the first path with the output of the second line C2 of the third path by controlling the first and twelfth optical switches SW1 and SW12, connects the input of the second line B2 of the second path with the output of the second line A2 of the first path by controlling the sixth and eighth optical switches SW6 and SW8, connects the input of the first line C1 of the third path with the output of the first line B1 of the second path by controlling the third and ninth optical switches SW3 and SW9, connects the input of the second line A2 of the first path with the output of the second line B2 of the second path by controlling the fifth and seventh optical switches SW5 and SW7, connects the input of the first line B1 of the second path with the output of the first line C1 of the third path by controlling the fourth and tenth optical switches SW4 and SW10, and connects the input of the second line C2 of the third path with the output of the first line A1 of the first path by controlling the eleventh and second optical switches SW11 and SW2. Note that each of the first to twelfth optical switches SW1 to SW12 is a 1×2 optical switch.

As shown in FIGS. 4B to 4E, the submarine branching unit 51 according to the comparative example uses 12 optical switches SWs, i.e., the first to twelfth optical switches SW1 to SW12, in total when it changes its state from the second state to the fifth state.

In contrast, the submarine branching unit 11 according to the example embodiment uses six optical switches SWs when it changes its state from the first state to the fifth state (see FIGS. 3A to 3E). Therefore, the submarine branching unit 51 according to the comparative example requires twice as many optical switches SWs as those of the submarine branching unit 11 according to the example embodiment.

As a result, in the comparative example, it is difficult to provide a submarine branching unit, a control method, and a non-transitory computer readable medium capable of implementing path switching of optical cables by using a smaller number of optical switches.

Note that although the present invention has been described as a hardware configuration in the above-described example embodiments, the present invention is not limited to the hardware configuration. It is also possible to realize the processing performed by each component by having a CPU (Central Processing Unit) execute a computer program.

In the above-described example embodiments, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). Further, the program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Although the present invention is described above with reference to example embodiments, the present invention is not limited to the above-described example embodiments. Various modifications that can be understood by those skilled in the art can be made to the configuration and details of the present invention within the scope and spirit of the invention.

Note that the present disclosure is not limited to the above-described example embodiments, and they may be modified as appropriate without departing from the scope and spirit of the disclosure.

REFERENCE SIGNS LIST 11, 51 SUBMARINE BRANCHING UNIT
111 CONTROL UNIT
SW1 FIRST OPTICAL SWITCH
SW2 SECOND OPTICAL SWITCH
SW3 THIRD OPTICAL SWITCH
SW4 FOURTH OPTICAL SWITCH
SW5 FIFTH OPTICAL SWITCH
SW6 SIXTH OPTICAL SWITCH
SW7 SEVENTH OPTICAL SWITCH
SW8 EIGHTH OPTICAL SWITCH
SW9 NINTH OPTICAL SWITCH
SW10 TENTH OPTICAL SWITCH
SW11 ELEVENTH OPTICAL SWITCH
SW12 TWELFTH OPTICAL SWITCH
P1 FIRST TERMINAL
P2 SECOND TERMINAL
P3 THIRD TERMINAL
P4 FOURTH TERMINAL
A FIRST PATH
B SECOND PATH
C THIRD PATH
A1 FIRST LINE OF FIRST PATH
A2 SECOND LINE OF FIRST PATH
B1 FIRST LINE OF SECOND PATH
B2 SECOND LINE OF THE SECOND PATH
C1 FIRST LINE OF THIRD PATH
C2 SECOND LINE OF THIRD PATH

What is claimed is:

1. A submarine branching unit comprising:
at least one memory storing instructions;
first to third optical switches each comprising first to fourth terminals; and
at least one processor configured to execute the instructions to;
control a connection of each of the first to third optical switches to a vertical connection or a horizontal connection based on a specified connection state, wherein
the first terminal of the first optical switch is connected to an input of a first line of a first path,
the second terminal of the first optical switch is connected to the first terminal of the third optical switch,
the third terminal of the first optical switch is connected to an output of the first line of a second path,
the fourth terminal of the first optical switch is connected to the third terminal of the second optical switch,
the first terminal of the second optical switch is connected to the third terminal of the third optical switch,
the second terminal of the second optical switch is connected to an output of a second line of the first path,
the fourth terminal of the second optical switch is connected to an input of a first line of a third path,
the second terminal of the third optical switch is connected to an output of a second line of the third path, and
the fourth terminal of the third optical switch is connected to an input of a second line of the second path.

2. The submarine branching unit according to claim 1, wherein each of the first to third optical switches is a 2×2 optical switch.

3. The submarine branching unit according to claim 1, wherein
the vertical connection is a connection in which in each of the first to third optical switches, the first terminal is connected to the second terminal; the third terminal is connected to the fourth terminal; the first terminal is not connected to the third terminal; and the second terminal is not connected to the fourth terminal, and
the horizontal connection is a connection in which in each of the first to third optical switches, the first terminal is connected to the third terminal; the second terminal is connected to the fourth terminal; the first terminal is not connected to the second terminal; and the third terminal is not connected to the fourth terminal.

4. The submarine branching unit according to claim 1, wherein the at least one processor configured to execute the instructions to:

controls the connection of each of the first to third optical switches to the vertical connection when implementing a first state in which: the input of the first line of the first path is connected to the output of the second line of the third path; the input of the second line of the second path is connected to the output of the second line of the first path; and the input of the first line of the third path is connected to the output of the first line of the second path, and controls the connection of each of the first to third optical switches to the horizontal connection when implementing a second state in which: the input of the first line of the first path is connected to the output of the first line of the second path; the input of the second line of the second path is connected to the output of the second line of the third path; and the input of the first line of the third path is connected to the output of the second line of the first path, controls the connection of the first optical switch to the horizontal connection and controls each of the second and third optical switches to the vertical connection when implementing a third state in which: the input of the first line of the first path is connected to the output of the first line of the second path; the input of the second line of the second path is connected to the output of the second line of the first path; and the input of the first line of the third path is connected to the output of the second line of the third path, controls the connection of each of the first and third optical switches to the vertical connection and controls the second optical switch to the horizontal connection when implementing a fourth state in which: the input of the first line of the first path is connected to the output of the second line of the third path; the input of the second line of the second path is connected to the output of the first line of the second path; and the input of the first line of the third path is connected to the output of the second line of the first path, and controls the connection of each of the first and second optical switches to the vertical connection and controls the third optical switch to the horizontal connection when implementing a fifth state in which: the input of the first line of the first path is connected to the output of the second line of the first path; the input of the second line of the second path is connected to the output of the second line of the third path; and the input of the first line of the third path is connected to the output of the first line of the second path.

5. A submarine branching unit comprising:

at least one memory storing instructions;

first to sixth optical switches each comprising first to fourth terminals; and at least one processor configured to execute the instructions to;

control a connection of each of the first to sixth optical switches to a vertical connection or a horizontal connection based on a specified connection state, wherein the first terminal of the first optical switch is connected to an input of a first line of a first path, the second terminal of the first optical switch is connected to the first terminal of the third optical switch, the third terminal of the first optical switch is connected to an output of the first line of a second path, the fourth terminal of the first optical switch is connected to the third terminal of the second optical switch, the first terminal of the second optical switch is connected to the third terminal of the third optical switch, the second terminal of the second optical switch is connected to an output of a second line of the first path, the fourth terminal of the second optical switch is connected to an input of a first line of a third path, the second terminal of the third optical switch is connected to an output of a second line of the third path, the fourth terminal of the third optical switch is connected to an input of a second line of the second path, the first terminal of the fourth optical switch is connected to an output of the first line of the first path, the second terminal of the fourth optical switch is connected to the first terminal of the sixth optical switch, the third terminal of the fourth optical switch is connected to an input of the first line of the second path, the fourth terminal of the fourth optical switch is connected to the third terminal of the fifth optical switch, the first terminal of the fifth optical switch is connected to the third terminal of the sixth optical switch, the second terminal of the fifth optical switch is connected to an input of the second line of the first path, the fourth terminal of the fifth optical switch is connected to an output of the first line of the third path, the second terminal of the sixth optical switch is connected to an input of the second line of the third path, and the fourth terminal of the sixth optical switch is connected to an output of the second line of the second path.

6. The submarine branching unit according to claim 5, wherein each of the first to sixth optical switch is a 2×2 optical switch.

7. The submarine branching unit according to claim 5, wherein the vertical connection is connections in which in each of the first to sixth optical switches, the first terminal is connected to the second terminal; the third terminal is connected to the fourth terminal; the first terminal is not connected to the third terminal; and the second terminal is not connected to the fourth terminal, and the horizontal connection is connections in which in each of the first to sixth optical switches, the first terminal is connected to the third terminal; the second terminal is connected to the fourth terminal; the first terminal is not connected to the second terminal; and the third terminal is not connected to the fourth terminal.

8. The submarine branching unit according to claim 5, wherein the at least one processor configured to execute the instructions to:

controls the connection of each of the first to sixth optical switches to the vertical connection when implementing a first state in which: the input of the first line of the first path is connected to the output of the second line of the third path; the input of the second line of the second path is connected to the output of the second line of the first path; the input of the first line of the third path is connected to the output of the first line of the second path; the input of the second line of the first path is connected to the output of the second line of the second path; the input of the first line of the second path is connected to the output of the first line of the third path, and the input of the second line of the third path is connected to the output of the first line of the first path, controls the connection of each of the first to sixth optical switches to the horizontal connection when implementing a second state in which: the input of the first line of the first path is connected to the output of the first line of the second path; the input of the second line of the second path is connected to the output of the second line of the third path; the input of the first line of the third path is connected to the output of the second line of the first path; the input of the second line of the first path is connected to the output of the first line of the third path; the input of the first line of the second path is connected to the output of the first line of the first path, and the input of the second line of the third path is connected to the output of the second line of the second path, controls the connection of each of the first and fourth optical switches to the horizontal connection and controls each of the second, third, fifth and sixth optical switches to the vertical connection when implementing a third state in which: the input of the first line of the first path is connected to the output of the first line of the second path; the input of the second line of the second path is connected to the output of the second line of the first path; the input of the first line of the third path is connected to the output of the second line of the third path; the input of the second line of the first path is connected to the output of the second line of the second path; the input of the first line of the second path is connected to the output of the first line of the first path; and the input of the second line of the third path is connected to the output of the first line of the third path, controls the connection of each of the first, third, fourth and sixth optical switches to the vertical connection and controls each of the second and fifth optical switches to the horizontal connection when implementing a fourth state in which: the input of the first line of the first path is connected to the output of the second line of the third path; the input of the second line of the second path is connected to the output of the first line of the second path, the input of the first line of the third path is connected to the output of the second line of the first path; the input of the second line of the first path is connected to the output of the first line of the third path; the input of the first line of the second path is connected to the output of the second line of the second path; and the input of the second line of the third path is connected to the output of the first line of the first path, and controls the connection of each of the first, second, fourth and fifth optical switches to the vertical connection and controls each of the third and sixth optical switches to the horizontal connection when implementing a fifth state in which: the input of the first line of the first path is connected to the output of the second line of the first path; the input of the second line of the second path is connected to the output of the second line of the third path; the input of the first line of the third path is connected to the output of the first line of the second path; the input of the second line of the first path is connected to the output of the first line of the first path; the input of the first line of the second path is connected to the output of the first line of the third path; and the input of the second line of the third path is connected to the output of the second line of the second path.

9. A method for controlling a submarine branching unit, the submarine branching unit comprising first to third optical switches each comprising first to fourth terminals, in which the first terminal of the first optical switch is connected to an input of a first line of a first path, the second terminal of the first optical switch is connected to the first terminal of the third optical switch, the third terminal of the first optical switch is connected to an output of the first line of a second path, the fourth terminal of the first optical switch is connected to the third terminal of the second optical switch, the first terminal of the second optical switch is connected to the third terminal of the third optical switch, the second terminal of the second optical switch is connected to an output of a second line of the first path, the fourth terminal of the second optical switch is connected to an input of a first line of a third path, the second terminal of the third optical switch is connected to an output of a second line of the third path, and the fourth terminal of the third optical switch is connected to an input of a second line of the second path, wherein the method comprises controlling a connection of each of the first to third optical switches to a vertical connection or a horizontal connection based on a specified connection state.

10. The method according to claim 9, wherein the controlling comprises switching each of the first to third optical switches using a 2×2 optical switch.

11. The method according to claim 9, wherein the controlling comprises:

when controlling to the vertical connection, connecting the first terminal to the second terminal and connecting the third terminal to the fourth terminal in each of the first to third optical switches, and when controlling to the horizontal connection, connecting the first terminal to the third terminal and connecting the second terminal to the fourth terminal in each of the first to third optical switches.

12. The method according to claim 9, wherein the controlling comprises controlling the connection of each of the first to third optical switches to the vertical connection when implementing a first state in which: the input of the first line of the first path is connected to the output of the second line of the third path; an input of a second line of the second path is connected to the output of the second line of the first path; and the input of the first line of the third path is connected to the output of the first line of the second path.

* * * * *